(12) United States Patent
Nishida

(10) Patent No.: US 7,925,775 B2
(45) Date of Patent: Apr. 12, 2011

(54) TCP CONGESTION CONTROL BASED ON BANDWIDTH ESTIMATION TECHNIQUES

(75) Inventor: Yoshifumi Nishida, Yokohama (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1134 days.

(21) Appl. No.: 10/821,105

(22) Filed: Apr. 7, 2004

(65) Prior Publication Data

US 2005/0228896 A1 Oct. 13, 2005

(51) Int. Cl.
*G06F 15/16* (2006.01)

(52) U.S. Cl. ......... 709/232; 709/233; 709/234; 709/235

(58) Field of Classification Search .................. 709/230, 709/231, 232, 233, 235

See application file for complete search history.

(56) References Cited

U.S. PATENT DOCUMENTS

| | | | | |
|---|---|---|---|---|
| 5,838,678 | A * | 11/1998 | Davis et al. .................. | 370/389 |
| 6,125,397 | A * | 9/2000 | Yoshimura et al. ........... | 709/235 |
| 6,731,600 | B1 * | 5/2004 | Patel et al. ..................... | 370/230 |
| 6,826,147 | B1 * | 11/2004 | Nandy et al. .................. | 370/229 |
| 7,266,613 | B1 * | 9/2007 | Brown et al. .................. | 709/235 |
| 2002/0010938 | A1 | 1/2002 | Zhang et al. | |
| 2002/0044528 | A1 | 4/2002 | Pogrebinsky et al. | |
| 2002/0071052 | A1 | 6/2002 | Itoh et al. | |
| 2002/0085587 | A1 | 7/2002 | Mascolo | |
| 2002/0141448 | A1 * | 10/2002 | Matsunaga .................... | 370/469 |
| 2003/0009571 | A1 * | 1/2003 | Bavadekar .................... | 709/230 |
| 2003/0103453 | A1 * | 6/2003 | Huang et al. ................. | 370/229 |
| 2003/0115337 | A1 | 6/2003 | Jayam et al. | |
| 2003/0115338 | A1 | 6/2003 | Jayam et al. | |
| 2003/0139929 | A1 | 7/2003 | He et al. | |
| 2003/0149785 | A1 | 8/2003 | Gerla et al. | |
| 2004/0015591 | A1 | 1/2004 | Wang | |
| 2005/0005024 | A1 * | 1/2005 | Samuels et al. ............... | 709/238 |
| 2005/0144303 | A1 * | 6/2005 | Zhang et al. .................. | 709/231 |

OTHER PUBLICATIONS

M. Allman, RFC 2581, TCP congestion control, 1999.*
J. C. Hoe; "Improving the Start-up Behavior of a Congestion Control Scheme for TCP," ACM SIGCOMM, pp. 1-11, Aug. 1996.

(Continued)

*Primary Examiner* — Dohm Chankong
*Assistant Examiner* — Joseph Greene
(74) *Attorney, Agent, or Firm* — John P. O'Banion

(57) ABSTRACT

Systems and methods are described for controlling congestion, such as within the transport control protocol (TCP) based on bandwidth estimation techniques which provide explicit indications of back-to-back packet traffic. In response to registered back-to-back traffic, receiver-side bandwidth estimation techniques are exploited to enhance the congestion control behavior of TCP based networks. By way of example, a sender marks packets in the header or by changing segment size within a packet to indicate whether the packet is being sent back-to-back. A receiver utilizes the explicit back-to-back information, optionally in conjunction with other back-to-back packet estimation techniques, when estimating available bandwidth and setting congestion parameters. In addition a mechanism for controlling the length of packet trains is described which is based on modulating the transmission of delayed acknowledgements, such as sending acknowledgements upon receipt of a selected number of packets.

32 Claims, 2 Drawing Sheets

OTHER PUBLICATIONS

M. Allman and V. Paxson; "On Estimating End-to-End Network Path Properties," ACM SIGCOMM, pp. 1-12, Sep. 1999.

L.S. Brakmo, S. W. O'Malley, L.L. Peterson; "TCP Vegas: New Techniques for Congestion Detection and Avoidance," ACM SIGCOMM, pp. 1-12 Aug. 1994.

M. Gerla, W. Weng, R.L. Gigno; "Bandwidth feedback control of TCP and real time sources in the Internet," GLOBECOM, pp. 1-5, 2000.

S. Mascolo, C. Casetti, M. Gerla, M.Y. Sanadidi and R. Wang; "TCP Westwood: Bandwidth Estimation for Enhanced Transport over Wireless Links," ACM Mobicom, pp. 287-297, Jul. 2001.

A. Capone, L. Fratta, F. Martignon; "Enhanced Bandwidth Estimation Algorithms in the TCP Congestion Control Scheme," IFIP Conference on Network and Enginerring for QoS, Security and Mobility, pp. 1-13 Oct. 2002.

* cited by examiner

TCP CONGESTION CONTROL BASED ON BANDWIDTH ESTIMATION TECHNIQUES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF INVENTION

1. Field of Invention

This invention pertains generally to data communication over a computer network, and more particularly to a method and apparatus for controlling transport control protocol congestion based on bandwidth estimation techniques.

2. Description of Related Art

The use of the transport control protocol/internet protocol (TCP/IP) to facilitate the transmission of information between two or more computer systems via one or more networks is well known. When a given network computer wishes to exchange information with another, a bi-directional data flow develops to allow information to be transmitted from one computer and received by the other computer. Typically, the information is distributed across a sequence of packets to simplify the transmission process and facilitate fast error detection and correction. The TCP/IP protocol suite ensures that the information to be transferred is properly segmented and sent from the transmitting computer as packets, as well as properly received and assembled into the complete data file at the receiving computer.

A number of terms utilized within the application are now described. The term packet will be used herein to collectively refer to blocks of information, such as within a packet stream. Packets as broadly referred to herein are inclusive of all information units, including headers, used to transport data and/or control information between nodes of the network. A data object to be sent is divided into a sequence of packets. Typically the packets are sent sequentially based on their position in the original data object. When sequential packets are communicated one after another in sequence they are referred to as being "back-to-back" packets, since they are sent in a single burst and the sequence is not broken by the communication of other forms of packets, such as according to retransmitting in response to packet errors. If sufficient bandwidth exists larger numbers of packets should be sent back-to-back. A segment is considered herein to comprise the data portion of any TCP/IP data packet or acknowledgment packet, and may have a size up to the maximum segment size (MSS) value in bits. The MSS is considered to be the size of the largest segment that the sender can transmit. This value can be based on the maximum transmission unit (MTU) of the network, the path MTU discovery algorithm, receiver maximum segment size (RMSS) or other factors. The segment size is not considered to include the TCP/IP headers and options. Congestion window, cwnd, is considered to comprise a TCP state variable that limits the amount of data a TCP can send. Data having a sequence number higher than the sum of the highest acknowledged sequence number and the minimum of cwnd is not to be sent over the TCP.

As is well known, the transmission control protocol (TCP) corresponds to the transport layer (layer 4) of the open system interconnection (OSI) reference model. The transmission control protocol generally provides stream data transfer, multiplexing, full duplex operation, segmentation and reassembly, along with efficient flow control.

The internet protocol (IP) is a network layer (layer 3) protocol that generally provides addressing information and some control information that enables packets to be routed. The IP protocol has two primary responsibilities: providing connectionless, best-effort delivery of datagrams to a network, and providing fragmentation and reassembly of datagrams to support data links with different maximum transmission units (MTU) sizes. Together, these two protocols form the core of the internet protocol suite that enables reliable delivery of data via a network.

When two computers communicate via a computer network using TCP/IP protocol, a data structure known as a transmission control block is typically utilized to facilitate data transmission, segmentation, reassembly, retransmission, acknowledgments, and the like. The transmission control block is used to track various parameters associated with the data transmit and receive process for a given data flow.

In packet communication based on TCP/IP, a host for transmitting data generally divides the data into a plurality (sequence) of segments. The host typically adds header information to the segments, such as a transmission source address or destination address, and sends the resultant packet to a network. At this time, the maximum packet length (MTU) transmittable from each host to a network is determined by the MTU supported by the protocol of the data link layer of a network connected to the host for exchanging data.

If the protocol of the transport layer is TCP, the maximum data length which can be contained in each packet is referred to as the maximum segment size (MSS). According to the IETF (Internet Engineering Task Force) standard RFC 879 "The TCP Maximum Segment Size and Related Topics", the MSS value is determined by subtracting a default IP header length and TCP header length from the above mentioned MTU.

When transmitting and receiving hosts are connected by the same data link, the most efficient data transmission method is to divide transmission data and transmit packets. Early in the development of the TCP/IP protocol, it was discovered that some control over the manner in which packets were injected into the network by the source host was needed to help with the problem of dropped packets.

Originally, the well known TCP protocol allowed a source to inject multiple packets into a network, up to a limit corresponding to a window or buffer size advertised by the receiver. In essence, the TCP source is allowed to send a number of packets equal to the congestion window size, which is generally referred to as the parameter "cwin" in the TCP standard. The TCP source then stops and waits for acknowledgments (ACKs) before resuming transmission. When the value of cwin is high, the TCP source manages to transmit several packets before feedback from the TCP receiver. When cwin is low, the opposite is true. The limited accuracy of bandwidth estimates has also curtailed any advantages which could arise from increasing packet train length.

Although such a windowing scheme may work for cases in which the source and the receiver are connected to the same network; problems were soon found in the case of routers disposed between the source and receiver having finite buffer sizes. The routers in this scenario would quickly run out of space to hold the incoming packets. To combat this problem a "slow start" procedure was developed in which the source limits the rate at which it injects new packets into the network according to the rate at which acknowledgments of successful receptions are returned by the receiver.

The slow start mechanism is beneficially utilized when transmissions are to commence on a network having unknown conditions. This mechanism provides for slowly probing the TCP to determine the available capacity, in order to avoid congesting the network with an inappropriately large burst of data. The slow start mechanism is utilized for this purpose at the beginning of a transfer, or after repairing loss detected by the retransmission timer.

Consequently, in addition to cwin, another congestion control parameter was introduced in TCP as the so-called "Slow Start Threshold", or ssthresh. This parameter is also used in setting the sending rate of the TCP source. In particular, ssthresh controls the rate of increase of the sending rate when feedback from the TCP receiver is positive. The parameter ssthresh has significant impact on network congestion control, however, it does not provide a precise and effective congestion control for packets in the TCP receiver side.

These current TCP congestion solutions provide a scheme of modulating the bandwidth of traffic streams transmitted across a congested network. By modulating the bandwidth of traffic streams, feedback to packet origin points, congestion avoidance processes or algorithms is provided via acknowledgment delays from the sending node. That is, the time at which such acknowledgments are received at the receiving nodes are increased. This impacts the rate at which new packets are transmitted between the receiving node and the sending node in a way to rescue the overall packet loss. The current TCP specification provides two solutions for generating such back-to-back transmission estimates: (a) estimating the number of back-to-back packets based on the amount of acknowledged data contained in the ACK packets, and (b) estimating the number of back-to-back packets based on using a timestamp option (requiring about 12 extra bytes per packet) wherein the transmission time of the packets is communicated to the receiver from which back-to-back transmissions can be generally inferred.

These approaches suffer from many drawbacks. Estimating back-to-back packets from the amount of data found in the ACK packets cannot be relied upon, since the sender may delay packet transmission (i.e. application requirements, Nagle algorithm, and so forth).

The use of timestamps requires a large amount of extra overhead per packet, and leads to increasing packet fragmentation. Furthermore, timebases for the virtual clock are often insufficiently precise to correctly detect back-to-back transmissions. Many conventional implementations also increase the value of the virtual clock for timestamps by 1 once every 100-500 msec which is insufficient to detect back-to-back transmission.

Therefore, a need exists for providing a robust and accurate form of bandwidth estimation for use in performing receiver-side TCP congestion control, and for controlling the length of packet trains. The present invention fulfills that need and others and overcomes the drawbacks of prior congestion control approaches.

BRIEF SUMMARY OF INVENTION

Systems and methods are described for controlling packet transmission congestion between a sending node and a receiving node, based on bandwidth estimation. By controlling packet transmissions, the packet loss rate can be reduced by utilizing the inventive aspects, such as during slow-start and for transitioning between slow-start and congestion avoidance techniques, or other congestion control mechanisms.

Proper bandwidth estimates for a TCP connection between a sender and a receiver can be utilized within a congestion control system for alleviating packet congestion. For example, whenever the TCP receiver perceives potential packet congestion it automatically modifies congestion control parameters (i.e. ssthresh, cwin, etc.) to control the transmission of packets.

In receiver side bandwidth estimations, the bandwidth of the transport control protocol (TCP) connection is estimated between the receiving node and the sending node in response to the back-to-back nature of the packets received.

In the present invention bandwidth estimates are enhanced by the sender explicitly marking each packet that is being sent back-to-back (alternatively inverse marking logic may be less preferably utilized). Two preferred embodiments are described for explicitly communicating, via marking, whether packets are sent as back-to-back packets.

In a first explicit marking embodiment the TCP header information transmitted by the sending node is modified. Preferably, an unreserved bit (or bits) in the TCP header is utilized for indicating the back-to-back transmission of the packet by the sender to the receiver.

In a second explicit marking embodiment, the TCP sender explicitly indicates a back-to-back packet by modifying the size of packets being sent in relation to the maximum segment size (MSS) value. The packet size is thus reduced from the number of bits specified in the MSS value, thereby indicating whether the packet has been sent back-to-back by the sender to the receiver.

In one embodiment of the invention, the above congestion estimation techniques may be utilized in combination with conventional estimation techniques. It will be appreciated that the ambiguity of conventional techniques can thus be corrected with the explicit techniques described.

In one embodiment of the present invention, the mechanisms for explicitly marking the back-to-back packets can be utilized to enhance delayed acknowledgment (ACK) mechanisms to increase the length of packet pair/trains in response to the more accurate bandwidth estimations.

The present invention can be described as a system for controlling network congestion, comprising: (a) a device configured for communicating over a network; and (b) means for explicitly indicating which packets are being sent back-to-back, and for setting congestion control parameters for a sender in response to estimating network bandwidth based on the receipt of explicit back-to-back packet indications.

The system can also incorporate techniques for estimating the number of back-to-back packets received from a sender and utilizing that information in conjunction with the explicit back-to-back packet information. For example, the number of back-to-back packets can be estimated by a receiver by determining the amount of data in acknowledgement packets (ACKs) and/or estimating whether transmissions were sent back-to-back in response to examining a packet timestamp. The back-to-back estimation techniques are preferably utilized in conjunction with the explicit indications of back-to-back packets. For example, the explicit values are checked with the estimate to assure the sender is properly marking back-to-back packets. The system preferably utilizes the estimations when the explicit markings are not being utilized or are invalid. By way of example, network congestion is controlled by modifying congestion parameters such as the slow start threshold, and the congestion window value.

The present invention may also be described in terms of the electronic hardware within the network device element, comprising: (a) a device configured for communicating over a network; (b) a processor within the device configured for controlling the sending and receiving of packets over the network; and (c) programming configured for executing on the processor for, (i) marking packets to be sent to explicitly indicate if they are being sent back-to-back, (ii) estimating network bandwidth in response to receipt of the explicit indications of back-to-back packets from other senders, and (iii) communicating congestion control parameters to a sender in response to said network bandwidth estimates. The network communications are preferably performed according to a transport control protocol (TCP), although it can be less preferably applied to similar packet-based protocols.

One aspect of the invention can be described as a system for controlling network congestion, comprising: (a) a device configured for communicating over a network; (b) a processor within said device configured for controlling the sending and receiving of packets over said network; and (c) programming configured for executing on the processor for, (i) estimating network bandwidth in response to receipt of explicit indications of back-to-back packets or utilizing back-to-back packet estimations, (ii) controlling the length of packet trains transmitted by the sender in response to altering the rate at which receipt acknowledgements (ACKs) are communicated from the receiver to the sender as based on estimated network bandwidth.

The present invention may also be described as a method of using bandwidth estimation to improve congestion control within a packet based network (i.e. TCP), comprising: (a) indicating, explicitly, within each packet whether it is being sent back-to-back; (b) estimating bandwidth in response to the explicit back-to-back indications; and (c) setting congestion control parameters (i.e. slow start threshold and congestion window value) in response to the bandwidth estimates.

The method can include estimating the number of packets being received back-to-back; and utilizing the packet number estimates in conjunction with the explicit back-to-back packet indications when estimating bandwidth. Generating estimates of back-to-back packet traffic may, for example, be performed by estimating the amount of data in acknowledgement packets (ACKs) and/or estimating whether transmissions were sent back-to-back in response to examining a packet timestamp. The estimates may be utilized for checking and replacing faulty or missing explicit back-to-back packet information making the system more robust while increasing the accuracy of estimates in response to the use of explicit back-to-back values.

The back-to-back packet marking facilitates improves bandwidth estimation provided with delayed acknowledgement algorithms. In this aspect of the invention the value of m for delayed packet pairs/trains is modified in response to bandwidth estimations based on the explicit back-to-back packet marking, wherein the length of packet pairs/trains m to be transmitted by a sender is changed.

It should be appreciated that the aspects of the present invention may be generally implemented separately or within combinations described herein or in combinations created by one of ordinary skill in the art based on the teachings herein, without departing from the present invention. The present invention is configured for providing numerous inventive aspects, including but not limited to the following.

An aspect of the invention is to provide increased bandwidth utilization within packet based networks.

Another aspect of the invention to control transport control protocol operations in response to bandwidth estimation techniques.

Another aspect of the invention is to provide a mechanism by which the sender can explicitly indicate to the receiver whether or not packets are being transmitted back-to-back.

Another aspect of the invention provides for using unreserved bits in the header for communicating the back-to-back nature of each packet.

Another aspect of the invention provides for decreasing the number of bits within a segment below the MSS value as a mechanism for communicating the back-to-back nature of each packet.

Another aspect of the invention provides for using the explicit back-to-back markings from sender to receiver, in conjunction with other receiver side estimations to overcome the ambiguity of conventional receiver side estimations and create a robust estimation environment.

Another aspect of the invention is to utilize explicit back-to-back packet marking within a modified delayed ACK mechanism to allow for the use of longer packet trains and improved bandwidth estimation accuracy.

Further aspects of the invention will be brought out in the following portions of the specification, wherein the detailed description is for the purpose of fully disclosing preferred embodiments of the invention without placing limitations thereon.

BRIEF DESCRIPTION OF SEVERAL VIEWS OF DRAWING(S)

The invention will be more fully understood by reference to the following drawings which are for illustrative purposes only:

DETAILED DESCRIPTION OF INVENTION

Referring more specifically to the drawings, for illustrative purposes the present invention is embodied in the apparatus generally shown in FIG. 1 through FIG. 4. It will be appreciated that the apparatus may vary as to configuration and as to details of the parts, and that the method may vary as to the specific steps and sequence, without departing from the basic concepts as disclosed herein.

A system and method for improving data communication in a computer network, such as the Internet or a packet switched network, is disclosed herein. Although discussed with reference to certain illustrated embodiments, upon review of this specification, those of ordinary skill in the art will recognize that the present invention may find application in a variety of systems. Therefore, in the following description the illustrated embodiments should be regarded as exemplary only and should not be deemed to be limiting in scope. It should also be noted that as used herein, the term "packet" broadly refers to packets, cells and other forms of information units used to transport data and/or control information within communication networks.

Existing congestion control approaches have generally viewed network traffic as essentially a random process. Recent work in the area of traffic modeling has shown that network traffic is in fact complicated in nature. However, since insufficient bandwidth continues to bottle-neck the communication path in many networks, improved solutions for increasing bandwidth utilization in response to congestion are needed. None of the conventional congestion control systems have an effective bandwidth estimation scheme, such as for use with Transport Control Protocol (TCP) protocol base networks. The present invention provides systems and methods for dynamically implementing bandwidth estimation for controlling TCP packet congestion in a network. The present invention provides effective and robust receiver side mechanisms for estimating bandwidth requirements between the receiver and a sender which are communicatively linked together.

In particular, within the present invention the TCP receiver monitors for information within the segments communicated from the sender, allowing the receiver to accurately detect the presence of back-to-back packet transmissions. In order to establish receiver-side bandwidth estimation, the receiver needs to know or determine which packets are transmitted back-to-back. The present invention allows explicitly communicating back-to-back packet transmissions from a sender to a receiver, such as by marking back-to-back packets using header bits or by decreasing packet size below the MSS.

Figure 1:
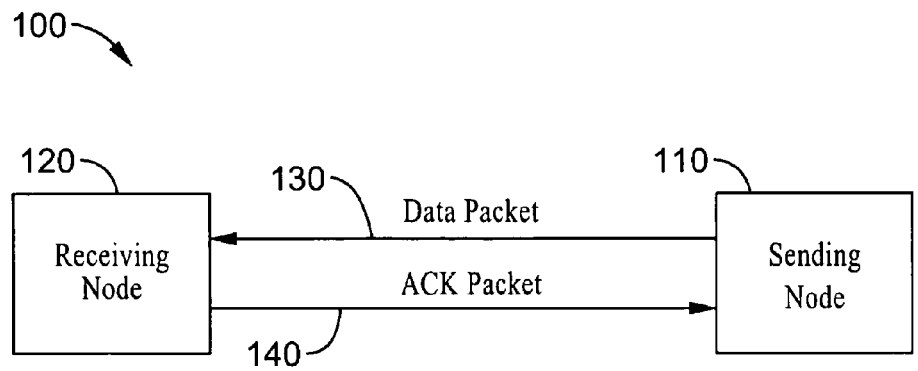
FIG. 1 is a block diagram of congestion control according to an embodiment of the present invention, showing the functional structure of a congestion control between sender and receiver nodes in a packet network.

FIG. 1 is a block diagram illustration of one embodiment of a communication network according to the present invention. As shown in the figure the network 100 comprises a sending node 110 and a receiving node 120. According to the invention, sender 110 explicitly marks back-to-back packets being sent, receiver 120 uses this information to estimate bandwidth, then the receiver communicates with a congestion control mechanism within sender 110 to regulate how packets are sent.

In the embodiment shown, the network comprises a packet-based communication network, such as TCP, UDP, and so forth. In this example sending node 110 and receiving node 120 communicate via a data packet link 130 and an ACK packet link 140. Embodiments of the bandwidth estimation and congestion control according to the invention may be implemented in firmware, hardware, or a combination of firmware and hardware.

According to this scenario the receiver determines the parameters for controlling the congestion it is experiencing and the transmissions from the sender are modulated in response to those parameters. A data packet output is transmitted over data packet link 130 with explicit back-to-back packet markings from sending node 110 to receiving node 120. Sending node 110 divides data to be transmitted in its transport layer into a number of segments in accordance with the TCP MSS (maximum segment size), to which headers are attached forming a sequence of packets. Receiving node 120 receives data packets transmitted by sending node 110 and outputs an acknowledgment packet over ACK packet link 140 back to sending node 110 in response. Receiver node 120 utilizes the explicit back-to-back packet markings to accurately estimate bandwidth wherein it can properly regulate sender side packet sending and control the value of m when sending delayed ACKs.

Figure 2:
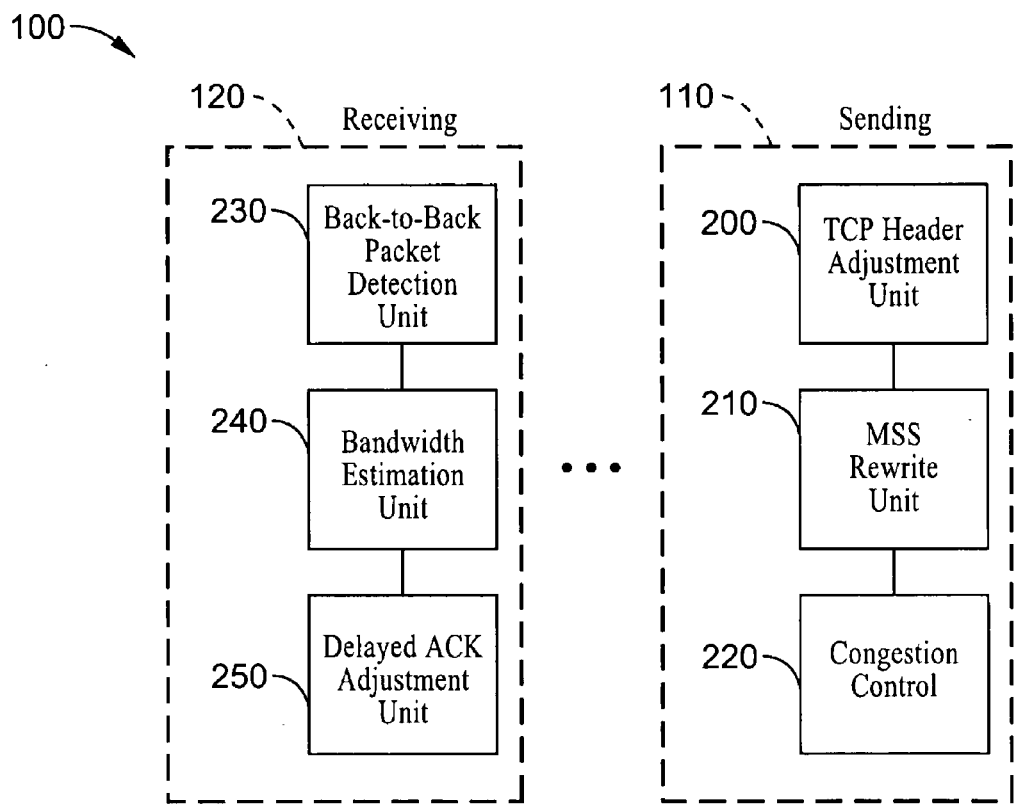
FIG. 2 is a block diagram of function modules according to an embodiment of the present invention, shown for use with the Transmission Control Protocol (TCP).

FIG. 2 illustrates functional units within an embodiment of sender 110 and receiver 120. It should be appreciated that network nodes are typically configured for performing both packet sending and reception, although in certain embodiments of the present invention a node could be alternatively configured for performing either packet sending or receiving. Shown within sending node 110 are blocks for explicit packet marking.

An embodiment of sending node 110 is shown with a TCP header adjustment unit 200, MSS (maximum segment size) rewrite unit 210, and a congestion control unit 220. Receiving node 120 is shown with a back-to-back packet detection unit 230, bandwidth estimation unit 240, and a delayed ACK adjustment unit 250.

Within sending node 110, a first marking embodiment is represented by the TCP header adjustment unit 200, which modulates at least one header bit in response to whether packets are being sent back-to-back. It should be appreciated that sending node 110 generates TCP headers as part of the data packets transmitted to receiving node 120. This form of back-to-back packet indication is preferably provided by utilizing one (or more) of the three unreserved bits of the header according to the current TCP specification, when a packet is transmitted or queued in the packet train or queue. This mode of operation allows the sender to explicitly indicate (mark) back-to-back packets to the receiver, wherein error-prone receiver side "estimating" of back-to-back packets is unnecessary.

Figure 3:
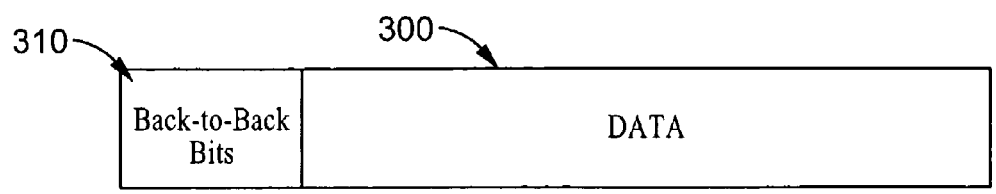
FIG. 3 is a framing structure for a TCP packet frame according to an aspect of the present invention, shown having a TCP header containing a back-to-back packet indicator.

FIG. 3 depicts a packet having data 300 and the inclusion of back-to-back marking bits within a header 310 of the packet. The packet shown is preferably a TCP packet frame, whose header is modified by utilizing a bit from within the unreserved bits 310 in the TCP header to set an explicitly indicate that a particular packet is being transmitted back-to-back. By way of example, at least one of the three unreserved bits is utilized for indicating a back-to-back transmission.

Referring again to FIG. 2, a second packet marking embodiment is represented by the MSS (maximum segment size) rewrite unit 210, which modulates the segment size from the MSS value to indicate whether packets are being sent back-to-back. It should be appreciated that only one explicit packet marking mechanism would typically be utilized, although a system could be implemented with more than one to allow it to be configured to use one or the other for various forms of network deployment.

A congestion control unit 220 is shown which modulates packet sending rate in response to information from receiver 120. The segment size being sent is preferably reduced a given number of bits from the maximum segment size (MSS) value as a way of marking whether or not a packet is being sent back-to-back. In a first mode, the MSS value is modified by a constant, such as (MSS−n), wherein n comprises a small positive value (i.e. 1, 2, 4). In this way back-to-back transmissions are explicitly marked by the sender based on the value of MSS detected on the receiver side. It should also be appreciated that the MSS value utilized by sending node 110 for marking back-to-back packets can be determined through negotiations with receiving node 120.

Receiver node 120 receives the packets from sender node 110 and back-to-back packet detection unit 230 determines if the packet was sent back-to-back; which is utilized by a bandwidth estimation unit 240.

In order to establish receiver-side bandwidth estimation, receiver node 120 needs to know which packets were transmitted back-to-back. Back-to-back packet detection unit 230 is configured according to included embodiments to detect packets which are marked utilizing either a back-to-back bit or reduced segment size from the MSS value. Back-to-back packet detection unit 230 checks to see if the packet header has been modified, or if the number of bits within the segment of the packet has been changed, such as containing fewer bits than specified by MSS (maximum segment size). It should be appreciated that the value of MSS is generally negotiable. In one embodiment of the present invention, when the sender has enough data to transmit multiple packets back-to-back, the MSS rewrite unit 220 uses (MSS−n) bytes as the size of packets to indicate explicitly that the particular packet is being transmitted back-to-back. For example, the value of n is preferably kept small (e.g., 1, 2 or 4). The back-to-back packet detection may be performed continuously or it may be performed in response to detecting specific conditions on the network, such as congestion which can trigger the back-to-back packet detection.

Upon successful reception of transmitted back-to-back data packets, an acknowledgment (ACK) packet is generated responsive to the data transmitted from the receiving node to the sending node, which may utilize a delayed ACK mechanism controlled by delayed ACK adjustment unit 250. Typically, the ACK packets are queued while waiting to be transmitted.

The detected back-to-back bits, or change in MSS level, allow accurately estimating the available bandwidth for the connection within bandwidth estimation unit 240, the level of back-to-back packets being somewhat inversely related to the level of congestion. Congestion control parameters are communicated to sending node 110 to modulate parameters of congestion control unit 220 in response to bandwidth estimation.

It should be appreciated that either of the above explicit back-to-back packet marking embodiments may be utilized in combination with non-explicit methods for estimating the level of back-to-back transmissions. It should be understood that the explicit methods described above rely on cooperation between the sender and receiver (packet marking on the sender and detecting of the markings on the receiver), while the non-explicit methods are performed on the receiver side. The level of back-to-back packet traffic can be estimated within back-to-back packet detection unit 230, or elsewhere, based on any conventional technique or combination of estimation techniques.

The use of conventional TCP congestion solutions, using timestamps and receiver estimations of back-to-back packets, are subject to a number of drawbacks as described in the background of the invention. For example, relying solely on such back-to-back packet estimates by the receiver is inherently inaccurate and error prone, because the sending unit 110 might delay packet transmissions for various reasons, such as in response to requirements within a particular application.

The other solution offered by conventional TCP schemes was to use the timestamp information transmitted with each packet that can propagate information for the transmission time of packets to the receiving node 120. In this case the receiving node 120 could then attempt to ascertain back-to-back packets by examining the differences in timestamp values for each packet. The bandwidth estimation unit 240 of the present invention can be configured according to an embodiment to operate in conjunction with any convenient back-to-back packet estimation mechanism, such as estimating back-to-back packets based on the amount of acknowledged data in ACK packets.

In the present invention the back-to-back packets are explicitly marked by the sender, such as by setting a bit within the TCP header, in order to provide a mechanism whereby the receiver can explicitly detect which packets are being sent back-to-back. It should be appreciated that packets may be queued up prior to sending, and the filling of the queue itself being somewhat indicative of bandwidth limitations. It should also be appreciated that other embodiments may be less preferably created for communicating the explicit back-to-back information, such as using a bit within the timestamp itself, for example the least significant bit (or bits), which can be alternatively utilized for injecting an explicit back-to-back indication.

The advantages of combining the explicit and non-explicit estimation techniques should be recognized, wherein the ambiguity of the non-explicit estimation approach is eliminated while congestion control based on bandwidth estimation can be made more robust by backing up the explicit approach with the non-explicit approach.

By way of example, the estimation approach according to one embodiment can be implemented to check whether a header bit or bits is being properly set to indicate which packets were sent back-to-back. If the bit, or bits, are not used or they do not change in a manner consistent with results produced from the non-explicit approach of determining back-to-back packets, then the explicit markings can not be relied upon, and the back-to-back packet estimation can be utilized in the bandwidth estimation. In a similar embodiment, the marking of back-to-back packets by changing the segment size in relation to MSS can be checked against back-to-back packet estimation mechanisms. In either case an immediate fallback is provided for estimating bandwidth and generating congestion control parameters to sender node 110 if the sender has not implemented, or is improperly marking, back-to-back packets.

A number of alternatives exist for creating embodiments in which the explicit and non-explicit back-to-back packet estimation mechanisms are combined. For example, current back-to-back estimates may be utilized for a sufficient period of time to verify the inclusion by a sender of correct explicit back-to-back information, or the estimates may be performed each time and utilized only when needed. For a further example: if explicit information is available it is checked; if correct it is used, otherwise the back-to-back estimates are utilized within the bandwidth estimation procedure. It should be appreciated therefore that a number of alternative methods for utilizing the explicit back-to-back notifications of the present invention may be adopted without departing from the teachings of the present invention.

As a result of using a combined approach within embodiments of the present invention the ambiguity is eliminated that is otherwise inherent in receiver side methods for estimating back-to-back packets in response to the amount of acknowledged in ACK packets, or timestamps. The congestion control scheme of the present invention generates explicit information to the receiver about back-to-back packets. The receiver preferably still performs the current estimates for back-to-back packets as a check on whether the sender is properly sending the explicit back-to-back information, which makes the combined approach more accurate than current TCP implementation and more robust than either approach.

Figure 4:
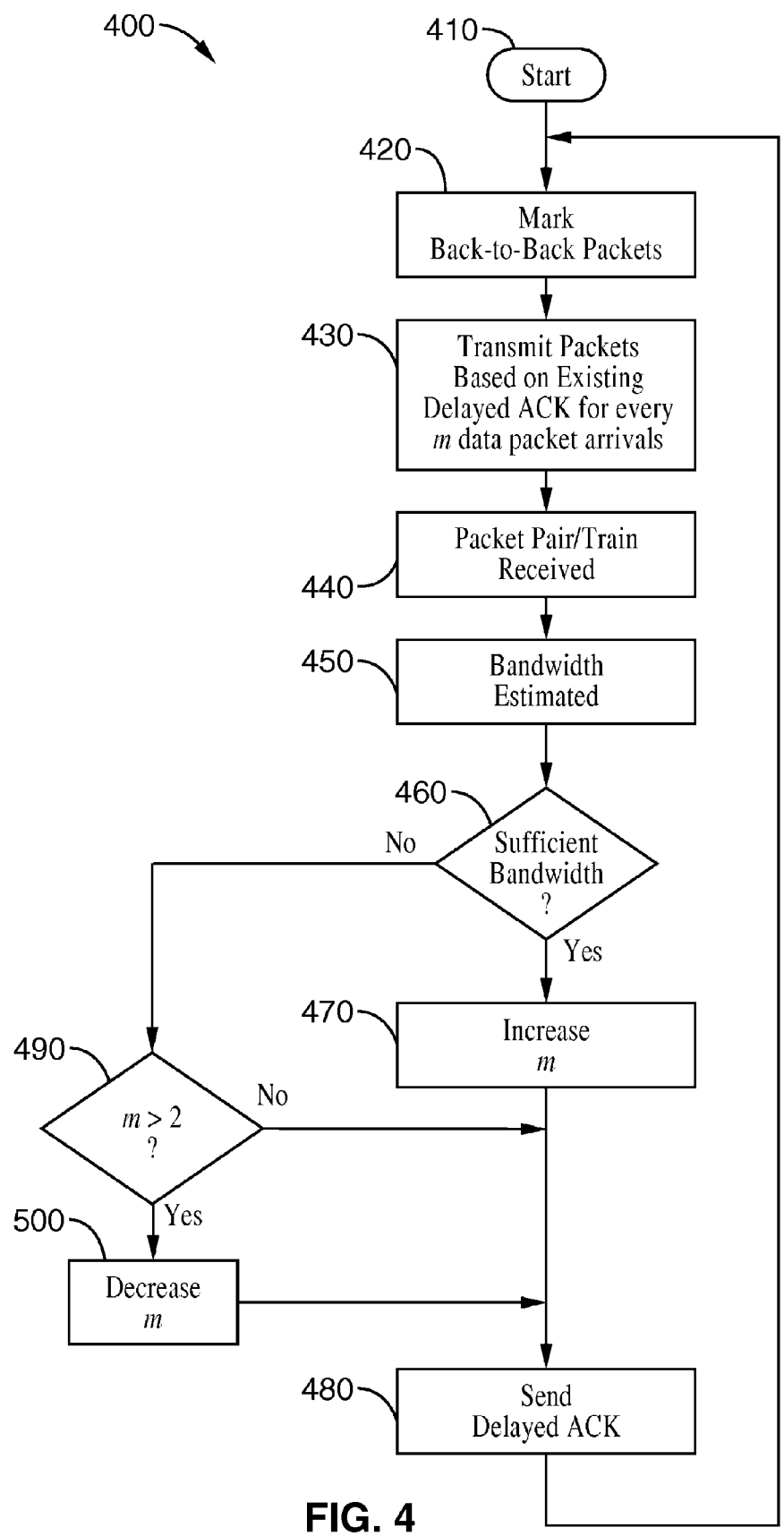
FIG. 4 is a flowchart of TCP congestion control estimation according to an embodiment of the present invention.

FIG. 4 illustrates the operation 400 of an example embodiment of delayed acknowledgement with the explicitly marked back-to-back packets of the present invention. In this aspect of the invention, the explicit back-to-back packet marking and detection scheme is utilized in conjunction with a delayed acknowledgement scheme, such as in which the sending node is configured for modulating the length of packet trains, based on the value m, to increase the accuracy of bandwidth estimations. The receiver preferably utilizes a delayed acknowledgment algorithm provided in the delayed acknowledgment adjustment unit 250 to send the ACK packets. The delayed acknowledgment unit enables TCP to send ACK packets once every given number of data packet arrivals, such as once for every two packets received (i.e. m=2). In response to these ACK packets the sender transmits a corresponding number of packets back-to-back, such as transmitting two or three data packets back-to-back. The majority of delayed ACK implementations keep the value of m small (i.e. 2) because the bandwidth estimation is subject to substantial inaccuracy wherein a large value of m can result in bursts of traffic which are too large for the actual conditions. In the present invention the receiver can accurately determine if sufficient bandwidth exists, wherein the value of m can be increased to cause longer packet train transmissions from the sender side.

Referring to the figure, once receiver 120 requests a packet transfer to start as depicted at block 410, the sender node marks packets which are to be sent back-to-back as per block 420, such as by utilizing a header bit or changing segment size. The packets are sent at block 430 according to the prevailing value for packet train length m, which starts at a low value (i.e. m=2).

The packet pair/train is received as per block 440 and the receiver performs bandwidth estimations, preferably in response to explicit back-to-back packet markings backed up by non-explicit back-to-back packet estimations mechanisms, as described previously. If sufficient bandwidth is detected to support a larger packet train, as detected at block 460, then the value of m is increased as represented by block 470 and the delayed ACK is sent to the sender as per block 480, wherein the cycle can repeat for another packet pair/train.

If insufficient bandwidth is available as detected at block 460, and the value of m is greater than two, as detected at block 490, then m is decreased at block 500 prior to the sending of the delayed ACK at block 480. If m is not greater than two, then m is not adjusted and the delayed ACK is sent as per block 480.

It should be appreciated that the above embodiment and the embodiments of the invention in general can be variously implemented by one of ordinary skill in the art without departing from the teachings herein.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for controlling network congestion, comprising: a device configured for communicating a sequence of packets over a network; means, within said device, for sending packets of a sequence in a back-to-back nature, wherein back-to-back packets are packets which are communicated, with no delay between the back of one packet and beginning of the next packet, one after another in a single burst within the sequence of packets; and means, within said device, for explicitly indicating which packets within said sequence of packets are being sent back-to-back, and for setting congestion control parameters for a sender in response to estimating network bandwidth based on the receipt, by a receiver, of explicit back-to-back packet indications that are placed within the modified header, by the sender, of the back-to-back packets; means for the receiver to control sender packet train size in response to bandwidth estimations by changing a rate value m at which receipt acknowledgements (ACKs) are communicated from the receiver to said sender, and in response to which the sender transmits a corresponding number of packets back-to-back; wherein said rate value m is the rate at which acknowledgements are communicated from the receiver to control the number of back-to-back packets to be sent by the sender; and wherein said rate value m is given as the number of back-to-back packets to be sent by the sender for each said acknowledgment (ACK) sent by the receiver; wherein said receiver sends an acknowledgement (ACK) for every given number of data packet arrivals according to the rate of acknowledgements, rate value m, and in response to the rate of acknowledgements the sender transmits a given number of data packets back-to-back, the given number of packets to be sent back-to-back being determined by rate at which the sender receives the acknowledgements.

2. A system as recited in claim 1, further comprising means for estimating the number of back-to-back packets received by the receiver from the sender and utilizing that information in conjunction with the explicit back-to-back packet indications.

3. A system as recited in claim 2, wherein said estimating of back-to-back packets received from the sender comprises determining the amount of data within acknowledgement packets (ACKs) and/or determining whether transmissions were sent back-to-back in response to examining packet timestamps.

4. A system as recited in claim 2, wherein said back-to-back estimates are utilized for checking the presence and validity of explicit back-to-back indications from the sender.

5. A system as recited in claim 2, wherein said back-to-back estimates are utilized when explicit back-to-back packet indications being received from the sender are either not available or appear erroneous.

6. A system as recited in claim 1, wherein said setting of congestion control parameters for a sender regulates packet transmissions by said sender in response to available bandwidth between said sender and the receiver.

7. A system as recited in claim 1, wherein said network operates according to a transport control protocol (TCP).

8. A system as recited in claim 1, wherein the size of segments being sent is reduced a given number of bits from said maximum segment size (MSS) for explicitly indicating by the sender to the receiver that said packets are being sent back-to-back.

9. A system as recited in claim 1, wherein said congestion control parameters comprise a slow start threshold.

10. A system as recited in claim 1, wherein said congestion control parameters comprise a congestion window value.

11. A system as recited in claim 1, wherein said means for explicitly indicating back-to-back packets and setting congestion control parameters comprises:
   a computer within said device;
   programming within said computer for,
      explicitly marking packets, in the sender, according to whether or not they are being sent back-to-back without delays between successive packets,
      estimating bandwidth based on receiving packets from the sender which are marked with back-to-back packet indications,
      determining congestion control parameters in response to said congestion estimating,
      communicating said congestion control parameters to the sender.

12. A system for controlling network congestion, comprising: a device configured for communicating over a network; a processor within said device configured for controlling the sending and receiving of packets over said network; and programming configured for executing on said processor for, sending packets of a sequence in a back-to-back nature in a single burst in which there is no delay between the back of one packet and the beginning of the next packet, marking packets, in a sender, to explicitly indicate if they are sent back-to-back, by placing an indication in a modified header of the packet that is to be sent by the sender; estimating network bandwidth in response to receipt of said explicit indications of back-to-back packets to generate network bandwidth estimates, establishing congestion control parameters in response to said network bandwidth estimates; controlling the length of packet trains transmitted by the sender in response to modifying the rate at which receipt acknowledgements (ACKs) are communicated from the receiver to the sender to which the sender transmits a corresponding number of packets back-to-back; wherein said rate at which acknowledgements are communicated by the receiver is configured to control the number of back-to-back packets to be sent by the sender; and wherein said rate is given as the number of back-to-back packets to be sent by the sender for each said acknowledgment (ACK) sent by the receiver; wherein said receiver sends an acknowledgement (ACK) for every given number of data packet arrivals according to the rate of acknowledgements, rate value m, and in response to the rate of acknowledgements the sender transmits a given number of data packets back-to-back, the given number of packets to be sent back-to-back being determined by rate at which the sender receives the acknowledgements.

13. A system as recited in claim 12, wherein said network communications are performed according to a transport control protocol (TCP).

14. A system as recited in claim 12, wherein the size of packets being sent is modulated in response to whether or not the packets are sent back-to-back.

15. A system as recited in claim 14, wherein said size of packets being sent is reduced from the maximum segment size (MSS) value according to a predetermined number of bits for indicating whether the packets are being sent back-to-back.

16. A system as recited in claim 15, wherein said predetermined number of bits can be 1, 2 or 4 bits.

17. A system as recited in claim 12, wherein said congestion control parameters comprise a slow start threshold.

18. A system as recited in claim 12, wherein said congestion control parameters comprise a congestion window value.

19. A system as recited in claim 12, wherein the size of segments being sent is reduced a given number of bits from said maximum segment size (MSS) for explicitly indicating by the sender to the receiver that said packets are being sent back-to-back.

20. A system as recited in claim 12, wherein said marking of packets is performed for every packet sent or performed in response to congestion.

21. A system for controlling network congestion comprising: a device configured for communicating over a network; a processor within said device configured for controlling the sending and receiving of packets over said network; and programming configured for executing on said processor for, sending packets of a sequence in a back-to-back nature in a single burst in which there is no delay between the back of one packet and the beginning of the next packet, explicit marking of packets by a sender of the packets, which are sent back-to-back, by placing an indication in a modified header of the packets, estimating network bandwidth in response to receipt of explicit indications of back-to-back packets or utilizing back-to-back packet estimations, controlling the length of packet trains transmitted by the sender in response to altering the rate at which receipt acknowledgements (ACKs) are communicated from the receiver to the sender as based on estimated network bandwidth; wherein said rate at which acknowledgements are communicated by the receiver comprises the number of back-to-back packets to be sent by the sender; wherein said rate value m is given as the number of back-to-back packets to be sent by the sender for each said acknowledgment (ACK) sent by the receiver; wherein said receiver sends an acknowledgement (ACK) for every given number of data packet arrivals according to the rate of acknowledgements, rate value m, and in response to the rate of acknowledgements the sender transmits a given number of data packets back-to-back, the given number of packets to be sent back-to-back being determined by rate at which the sender receives the acknowledgements; and wherein the size of segments being sent is reduced a given number of bits from said maximum segment size (MSS), or the setting of at least one header bit is changed, for explicitly indicating by the sender to the receiver that said packets are being sent back-to-back.

22. A method of using bandwidth estimation to improve transport control protocol (TCP) congestion control within a packet based network, comprising: marking each packet explicitly by a sender that is being sent back-to-back, from the sender, to a receiver, by placing an indication in a modified header of the packet;
   wherein packets of a sequence are in a back-to-back nature when sent in a single burst in which there is no delay between the back of one packet and the beginning of the next packet; estimating bandwidth in response to receiving packets from other senders which are explicitly marked as back-to-back packets; and
   communicating congestion control parameters to the sender in response to said bandwidth estimates; altering the rate at which receipt acknowledgements (ACKs) are communicated from the receiver to the sender as based on estimated network bandwidth whereby the sender transmits a corresponding number of packets back-to-back; wherein said rate at which acknowledgements are communicated by the receiver comprises the number of back-to-back packets to be sent by the sender; wherein said rate value m is given as the number of back-to-back packets to be sent by the sender for each said acknowledgment (ACK) sent by the receiver; wherein said receiver sends an acknowledgement (ACK) for every given number of data packet arrivals according to the rate of acknowledgements, rate value m, and in response to the rate of acknowledgements the sender transmits a given number of data packets back-to-back, the given number of packets to be sent back-to-back being determined by rate at which the sender receives the acknowledgements; and wherein the size of segments being sent is reduced a given number of bits from said maximum segment size (MSS) for explicitly indicating by the sender to the receiver that said packets are being sent back-to-back.

23. A method as recited in claim 22, further comprising:
estimating the number of packets being received back-to-back; and
utilizing said packet number estimates in conjunction with the explicit back-to-back packet indications when estimating bandwidth.

24. A method as recited in claim 23, wherein said estimating of back-to-back packets received from a sender comprises estimating the amount of data in acknowledgement packets (ACKs) and/or estimating whether transmissions were sent back-to-back in response to examining a packet timestamp.

25. A method as recited in claim 23, wherein said back-to-back estimates are utilized for checking the presence and validity of explicit back-to-back indications from a sender.

26. A method as recited in claim 23, wherein said back-to-back estimates are utilized when explicit back-to-back packet indications being received from a sender are either not available or appear erroneous.

27. A method as recited in claim 22, wherein said changing of the size of packets being sent is based on reducing the number of bits in a packet from the maximum segment size (MSS) by a predetermined number of bits.

28. A method as recited in claim 27, wherein said predetermined number of bits can be 1, 2 or 4 bits.

29. A method as recited in claim 22, further comprising controlling the length of packet trains transmitted by a sender in response to modifying the rate at which receipt acknowledgements (ACKs) are communicated from a receiver.

30. A method as recited in claim 29, wherein said modifying of the rate at which receipt acknowledgements (ACKs) are communicated comprises establishing a predetermined number of packet receptions before packet acknowledgement.

31. A method as recited in claim 22, wherein said congestion control parameters comprise a slow start threshold.

32. A method as recited in claim 22, wherein said congestion control parameters comprise a congestion window value.

* * * * *